(No Model.)
L. F. CAMP.
FILLING INDICATOR AND GAGE.
No. 538,657. Patented May 7, 1895.
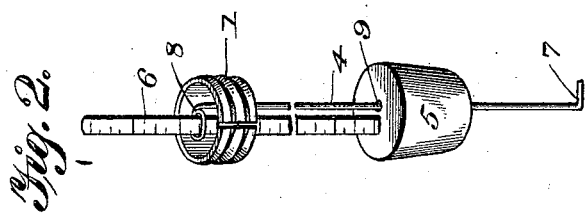
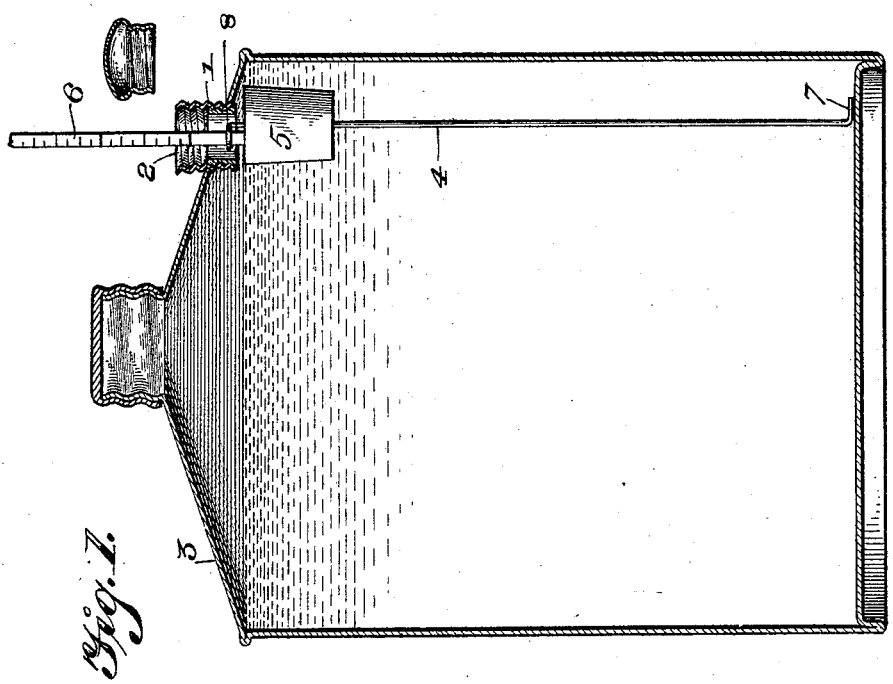
Witnesses
E. H. Monroe
J. F. Riley
Inventor
Louis F. Camp.
By his Attorneys.
C. A. Snow & Co.

UNITED STATES PATENT OFFICE.

LOUIS FAYETTE CAMP, OF TUNKHANNOCK, PENNSYLVANIA.

FILLING INDICATOR AND GAGE.

SPECIFICATION forming part of Letters Patent No. 538,657, dated May 7, 1895.

Application filed February 4, 1895. Serial No. 537,278. (No model.)

*To all whom it may concern:*

Be it known that I, LOUIS FAYETTE CAMP, a citizen of the United States, residing at Tunkhannock, in the county of Wyoming and State of Pennsylvania, have invented a new and useful Filling Indicator and Gage, of which the following is a specification.

The invention relates to improvements in filling indicators and gages for cans, lamps, barrels and similar receptacles.

The object of the present invention is to provide a simple and inexpensive device adapted to be readily applied to the filling or other openings of cans, lamps and various other receptacles, and capable of indicating the quantity of liquid within a receptacle, to enable it to be readily seen, the quantity of liquid contained therein for the purpose of taking an inventory, and also to ascertain whether or not the receptacle requires refilling.

The invention consists in the construction, and novel combination and arrangement of parts hereinafter fully described, illustrated in the drawings and pointed out in the claim hereto appended.

In the drawings, Figure 1 is a vertical sectional view showing a gage and indicator constructed in accordance with this invention and applied to a receptacle. Fig. 2 is a detail perspective view of the device detached.

Similar numerals of reference designate corresponding parts in both figures of the drawings.

1 designates a split ring, capable of adjustment and provided with exterior threads and adapted to be inserted in a filling orifice 2, of a can 3, or other receptacle, and adapted to engage the screw threads thereof, and designed to be located below and out of contact with the screw cap or stopper. The ring has secured to it a depending guide rod 4, on which slides an adjustable or vertically movable float 5, which carries an indicator or measuring bar 6, rigidly secured to the float and extending upward therefrom, and provided with suitable graduations. The guide rod has its lower end 7, bent at an angle to form a stop to prevent the float 5, which may be of cork, wood, or a hollow metal ball or the like, from becoming displaced, and the ring is provided on its interior with a guide 8, loosely receiving the indicator or measuring bar and permitting the same to move freely through it.

The float is provided with a central opening 9, for the reception of the rigid depending guide rod and is of sufficient size and possesses sufficient buoyancy to carry the indicator or measuring bar 6, and rests when free upon the surface of the liquid. The measuring bar or indicator is of sufficient weight to sink the float so that the upper face of the same is on a level with the surface of the liquid, and it will be readily apparent that the extent the bar projects through the filling orifice will indicate the quantity of liquid within the receptacle.

The device is applicable to all kinds of opaque vessels and receptacles, such as metal lamps, cans and barrels, and the like, and it will not only indicate when the vessel or receptacle is full, but by removing the screw cap or stopper, it will also show the quantity of liquid within the vessel or receptacle.

It will be seen that the device is exceedingly simple and inexpensive in construction, that it is applicable to all kinds of vessels and receptacles, and that it not only shows when the vessel or receptacle is full, to prevent overflow, but will also indicate the exact quantity of liquid contained within the same.

Changes in the form, proportion and the minor details of construction may be resorted to without departing from the principle or sacrificing any of the advantages of this invention, such as adapting the ring to fit various kinds of filling orifices or openings in order that it may be applied to barrels, demijohns, and similar receptacles.

Having thus described the invention, what is claimed, and desired to be secured by Letters Patent, is—

A filling indicator and gage adapted to be applied to an opening or orifice of a vessel or receptacle, and comprising a ring adapted to fit such opening or orifice and provided on its interior with a guide, a rigid depending guide rod secured at its upper end to the ring and provided at its lower end with a stop, a float having an opening receiving the guide rod, said float being adapted to move vertically on the same, and an indicator or measuring rod secured to and carried by the float and extending upward therefrom and arranged in the guide of the ring and adapted to indicate the quantity of liquid within the vessel or receptacle, said guide rod and indicator or measuring rod being of a length equal to the depth of the vessel or receptacle, substantially as described.

In testimony that I claim the foregoing as my own I have hereto affixed my signature in the presence of two witnesses.

LOUIS FAYETTE CAMP.

Witnesses:
CYRUS D. CAMP,
E. B. HAMLIN.